Nov. 18, 1947.  A. V. NIELSEN  2,431,193
FLUID HEATED COOKING UTENSIL
Filed Feb. 5, 1945

Inventor
A. VICTOR NIELSEN
By Carlsen + Hazle
Attorneys

Patented Nov. 18, 1947

2,431,193

UNITED STATES PATENT OFFICE 2,431,193

FLUID HEATED COOKING UTENSIL

Albert Victor Nielsen, Minneapolis, Minn.

Application February 5, 1945, Serial No. 576,273

1 Claim. (Cl. 126—376)

This invention relates to improvements in cooking utensils.

The invention has as its primary object the improvement of such cooking utensils as are suitable so that the maximum heating surface will be exposed to the stove or other heat source and with surrounding heat collecting pockets so arranged as to collect the heat and hold it in effective contact with the walls of the utensil and to thereby heat the contents thereof to best advantage. Another object is to provide a utensil and means embodied therein for increasing its heating and cooking efficiency in a simple and effective manner.

These and other more detailed and specific objects will be disclosed in the course of the following specification, reference being had to the accompanying drawing, in which—

Figure 1:
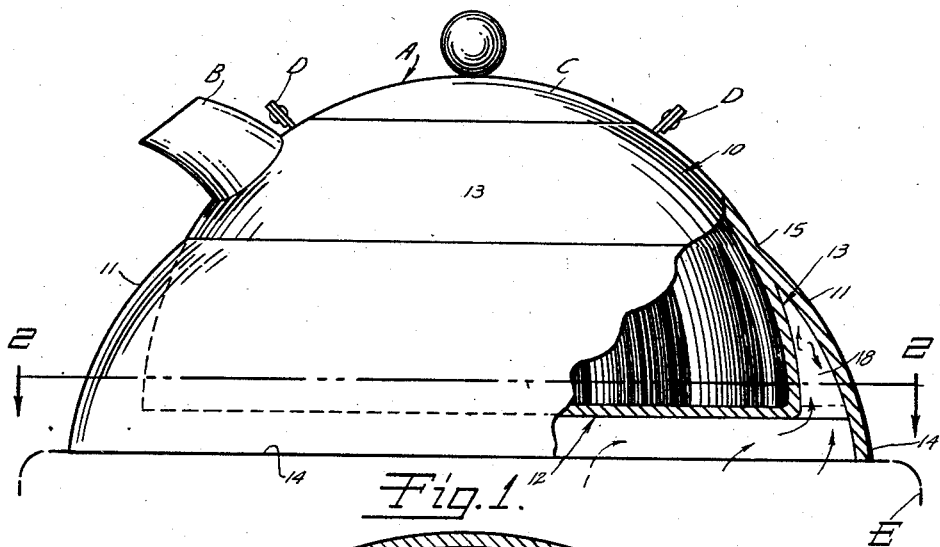
Fig. 1 is a side elevation, partially in section, of a teakettle to which my invention is applied, a part of the stove top or other heating unit being shown in broken lines.

Referring now more particularly and by reference characters to the drawing A indicates generally a utensil in the form of a teakettle which has been chosen to illustrate one application of my invention. This teakettle has as conventional parts the spout B, removable cover C and the handle only partially shown at D.

In accordance with my invention the receptacle or pot portion 10 of the teakettle, which contains the water to be heated or boiled, has an integral outwardly and downwardly flaring outer wall or rim portion 11 which extends from a point below the spout B downwardly some distance below the closed bottom 12 of the utensil, and which completely surrounds the lower part of the wall portion 13 of the utensil. The lower edge 14 of this rim 11 is continuous and forms the base upon which the utensil rests, for example on the top of the stove indicated at E in Fig. 1. The bottom 12 of the utensil is thus held some distance above the stove top as clearly shown. The upper edge of the rim portion 11 is joined, as indicated at 15, to the wall portion 13 of the utensil thus closing the space formed within the rim portion 11 except around the bottom thereof.

Figure 2:
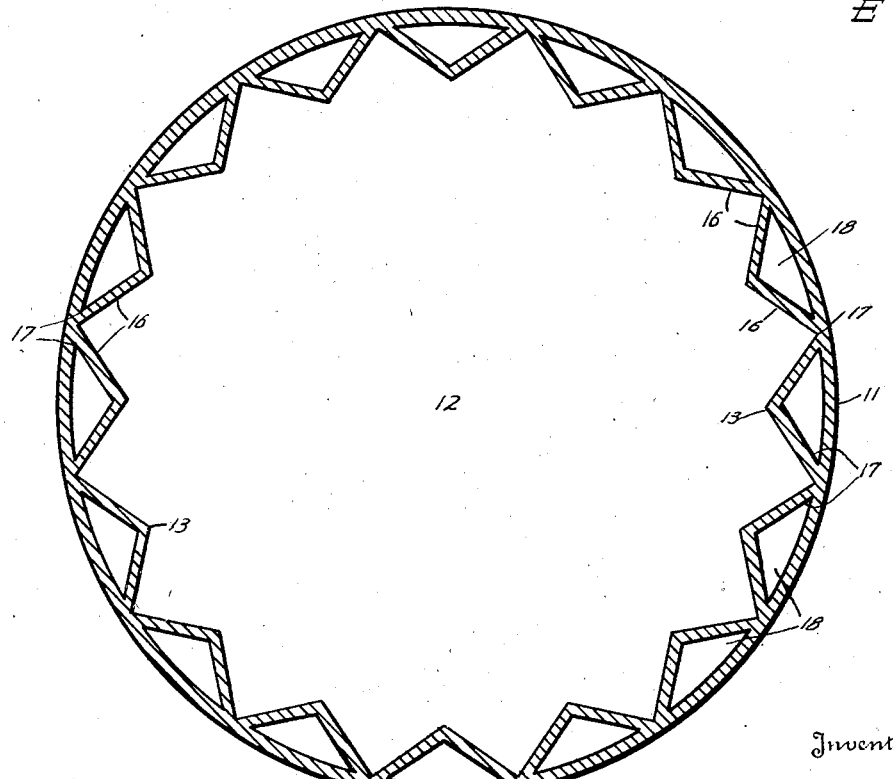
Fig. 2 is a horizontal sectional view along the line 2—2 in Fig. 1.

That part of the wall 13 of the utensil enclosed by the rim portion 11 is formed with a series of alternately outwardly and inwardly extending and angled undulations or folds 16 by which this part of the structure, as viewed in plan, assumes a crimped shape (Fig. 2). The outer extremities of these folds 16 are joined to the inner surface of the rim portion 11, as indicated at 17, while the bottom 12 of the utensil, of course, is shaped to fit to the end that the utensil is made watertight.

The foregoing construction is such that the annular space about the lower double-walled part of the utensil, of which the rim portion 11 forms the outer wall is divided into a series of upwardly and inwardly tapering heat collecting pockets or cells 18 which open only in a downward direction. Thus heat rising from beneath the utensil, in addition to playing over the bottom 12, will flow upwardly into the pockets 18 in heat exchanging relation to the contents of the utensil. It will be noted that the formation of the wall 13 is such that a maximum area thereof, much greater than were it only circular, will be exposed to the heat in the pockets; and furthermore that the escape of the heat around the utensil is prevented by the overhanging lower margin of the rim portion 11. All these factors contribute to the attainment of my object of obtaining the maximum of effectiveness upon the contents of the utensil from a given amount of heat.

I do not, of course, limit myself to the application of my pocketed, double-walled construction to teakettles but may employ it in connection with any type or kind of utensil, pot or the like to which it may be suitable.

It is understood that suitable modifications may be made in the structures disclosed, provided that such modifications come within the spirit and scope of the appended claim. Having now therefore fully illustrated and described my invention, what I claim to be new and desire to protect by Letters Patent is:

A utensil having a double wall portion around its lower part and comprising an inner wall and an outwardly spaced outer wall joined around its upper edge to said inner wall and flaring outwardly and downwardly with respect thereto, and the said inner wall having a series of first outwardly and then inwardly angled portions joined at their outermost extremities to the inside of the outer wall and forming a series of upwardly and inwardly tapering heat collecting cells.

A. VICTOR NIELSEN.

REFERENCES CITED

The following references are of record in the file of this patent:

UNITED STATES PATENTS

| Number | Name | Date |
|---|---|---|
| 172,857 | Huntley | Feb. 1, 1876 |
| 229,450 | Noble | June 29, 1880 |
| 795,287 | Knox | July 25, 1905 |
| 1,034,563 | Arctander | Aug. 6, 1912 |
| 1,169,006 | Ceperly | Jan. 18, 1916 |
| 1,447,813 | Patrick | Mar. 6, 1923 |
| 2,014,931 | Genouar | Sept. 17, 1935 |